United States Patent [19]

Overstreet et al.

[11] 4,405,889
[45] Sep. 20, 1983

[54] POWER SUPPLY FOR REPETITIVE DISCHARGE APPARATUS

[75] Inventors: Scott M. Overstreet, Los Altos Hills; C. Henning Swenson, Los Altos, both of Calif.

[73] Assignee: GTE Products Corporation, Stamford, Conn.

[21] Appl. No.: 316,157

[22] Filed: Oct. 29, 1981

[51] Int. Cl.³ ............................................. H02J 15/00
[52] U.S. Cl. ........................................ 320/1; 323/282; 363/86
[58] Field of Search ............................ 307/108; 320/1; 323/237, 338, 282, 223; 328/67, 68; 363/49, 86

[56] References Cited

U.S. PATENT DOCUMENTS 3,749,976 7/1973 Colyn .................................. 328/67 X
3,963,945 6/1976 Colyn .................................. 328/67 X
4,194,143 3/1980 Farkas et al. ........................ 320/1 X Primary Examiner—William M. Shoop
Attorney, Agent, or Firm—John F. Lawler

[57] ABSTRACT

A power supply for repetitive discharge apparatus such as a laser comprises an unregulated DC source, a primary storage capacitor, a discharge capacitor forming part of the apparatus and an energy feedback circuit between the discharge and storage capacitors operative to return to the storage capacitor energy greater than that required for a predetermined charge level on the discharge capacitor. A switch responsive to the voltage on the discharge capacitor operates a divert excess charging current into resonant charging elements in the feedback circuit for return to the primary storage capacitor. Transfer of the excess charging energy is accomplished nondissipatively to provide highly efficient cycle by cycle voltage regulation.

2 Claims, 5 Drawing Figures

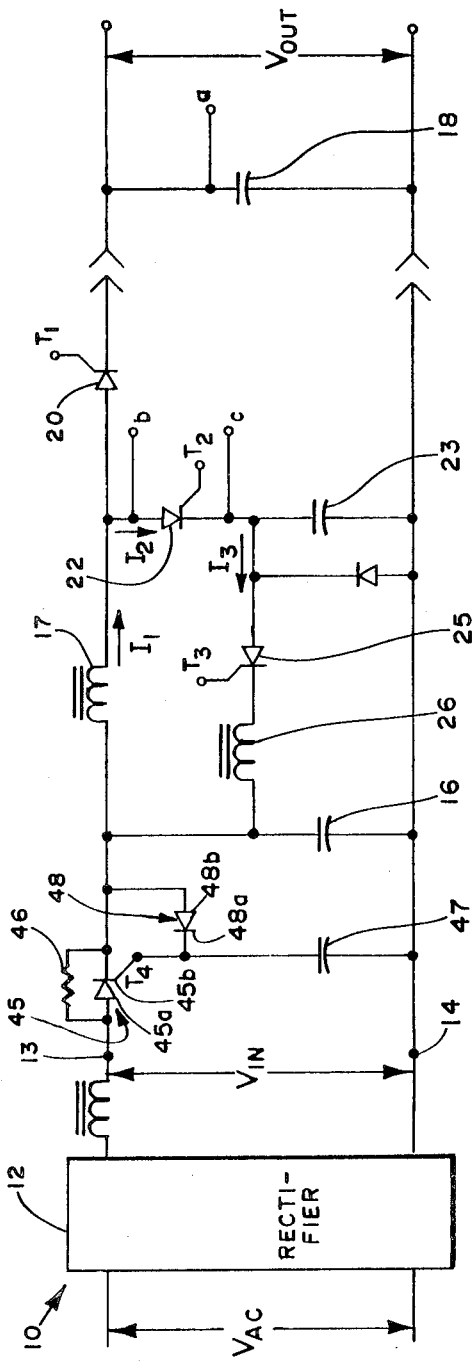
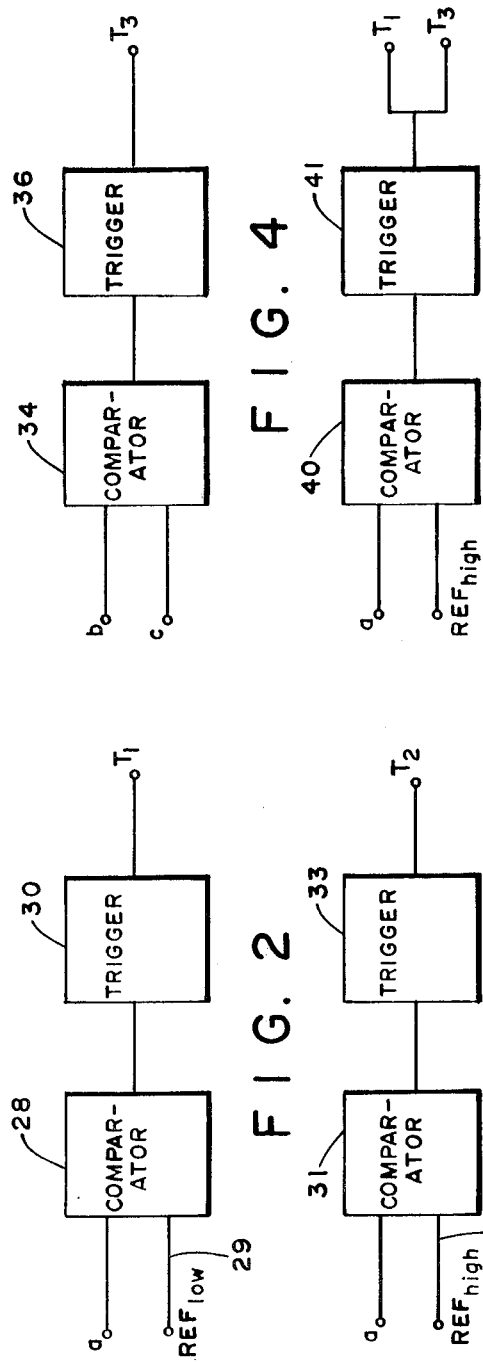

POWER SUPPLY FOR REPETITIVE DISCHARGE APPARATUS

BACKGROUND OF THE INVENTION

This invention was made under a contract with the Department of the Air Force.

This invention relates to power supplies and more particularly to a power supply for repetitive discharge apparatus.

Certain repetitive discharge apparatus such as a pulsed laser system are utilized in applications which require a succession of light pulses having equal magnitudes. Such applications include laser radar systems. A prior technique for achieving cycle by cycle pulse amplitude regulation utilizes a charging capacitor connected to a regulated power supply through an inductor and a silicon controlled rectifier (SCR) which when triggered to the conducting state causes the capacitor to be resonantly charged through the inductor. A second SCR connected in parallel with the inductor is triggered when the voltage on the charging capacitor reaches the desired magnitude and diverts charging current from the latter to provide cycle by cycle regulation. The problem with this technique is that excess energy in the charging system is dissipated as heat in the inductor and results in undesirable inefficiencies. Moreover, this sytem also requires a regulated DC supply.

This invention is directed to an improved circuit for cycle by cycle regulation of the output of such a charging circuit.

OBJECTS AND SUMMARY OF THE INVENTION

A principal object of the invention is the provision of a highly efficient power supply for repetitive discharge apparatus in which cycle by cycle regulation of the output is achieved.

A further object is the provision of such a power supply which is capable of operating from an unregulated DC source.

These and other objects of the invention are achieved with a resonant charging circuit having a resonant feedback path to the primary storage capacitor for nondissipatively recycling on each charging cycle the portion of the charging energy in excess of that required to produce the predetermined voltage on the output capacitor.

DESCRIPTION OF THE DRAWINGS

FIG. 1 is a schematic diagram of a power supply embodying this invention.

FIGS. 2, 3 and 4 are block diagrams of circuit control elements used with the power supply of FIG. 1.

FIG. 5 is a modified form of control circuit.

DESCRIPTION OF PREFERRED EMBODIMENTS

Referring now to the drawings, FIG. 1 depicts a power supply 10 embodying the invention and comprising a rectifier 12 connected to a source of AC voltage and producing at its output terminals 13 and 14 an unregulated DC voltage $V_{In}$. A primary storage capacitor 16 is connected across terminals 13 and 14. An inductor 17 connected in series with terminal 13 and an output charging capacitor 18 connected across terminals 13 and 14 on the output side of inductor 17 constitutes a resonant charging circuit. Capacitor 18 by way of example may be the charging capacitor of a laser pulse forming network. A silicon controlled rectifier (SCR) switch 20 having a trigger lead $T_1$ is connected in series with inductor 17 and capacitor 18 with the anode electrode connected to the inductor as shown.

Circuit operation is such that charging current $I_1$ flows from charged capacitor 16 through inductor 17 and switch 20 into capacitor 18 when trigger lead $T_1$ of switch 20 is energized. As a consequence, the voltage on capacitor 18 rises to $2 V_{In}$ which causes current $I_1$ to reverse, thereby opening switch 20, in inherent characteristic of the SCR switch. In practice a somewhat lower voltage is developed on capacitor 18 depending on circuit element losses and any residual charge present in capacitor 18 at the beginning of the charge cycle. In accordance with prior practice, $V_{In}$ is a regulated voltage and the output voltage across capacitor 18 is set by adjusting $V_{In}$. In this simplest form, automatic "closed loop" output regulation is not possible on a cycle by cycle basis once the charge cycle is initiated and the circuit is committed. Average output voltage regulation is all that is possible.

In order to achieve cycle by cycle regulation wherein the maximum voltage developed across capacitor 18 on successive cycles is precisely the same, a second SCR switch 22 and an intermediate capacitor 23 are connected in series and across terminals 13 and 14 with the anode of switch 22 connected between inductor 17 and switch 20. Switch 22 has a trigger lead $T_2$ which, when energized, causes switch 22 to close and thereby divert all of charging current $I_1$ to capacitor 23, the diverted current being shown as $I_2$. When switch 22 is triggered on, a DC resonant charging circuit comprising inductor 17 and capacitor 23 is formed.

A third SCR switch 25 having a trigger lead $T_3$ and a second inductor 26 are connected in series with each other between capacitors 16 and 23 with the anode of switch 25 connected between the cathode of switch 22 and capacitor 23. Switch 22 is turned off automatically by the reversal of current $I_2$ when a full charge on capacitor 23 is reached. When switch 25 is triggered, a third resonant circuit comprising capacitor 23 and inductor 26 is formed by which the charge on capacitor 23 is transferred to capacitor 16.

Switch 20 is triggered to the conducting state when the voltage on capacitor 18 falls to a predetermined low threshold. A trigger signal for application to switch terminal $T_1$ is derived by comparing the voltage on capacitor 18 via lead a in a comparator 28, see FIG. 2, such as a differential amplifier, to which a low threshold reference voltage is applied through lead 29. When the voltage on capacitor 18 falls below the low threshold reference voltage on line 29, an output from comparator 28 is applied to trigger circuit 30 which produces a trigger voltage on terminal $T_1$.

In order to activate switch 22, the voltage on capacitor 18 is similarly applied to comparator 31, see FIG. 3, to which high or upper threshold reference voltage is applied by lead 32. The value of the reference voltage applied to lead 32 corresponds to a voltage slightly below the maximum charging voltage of capacitor 18 and is the desired output voltage of pulses generated by the pulse forming network of which capacitor 18 is a part. The output from comparator 31 is applied to a trigger circuit 33 which generates an output on terminal $T_2$ of switch 22.

Switch 25 is controlled by the direction of current through switch 22 as determined by terminals b and c connected to comparator 34, see FIG. 4. When capacitor 23 is fully charged by current $I_2$, the current reverses its cirection, which condition is sensed by comparator 34 to produce an output that is applied to trigger circuit 36 for generating a trigger voltage on terminal $T_3$ of switch 25.

In operation, assume input capacitor 16 is charged to the voltage $V_{In}$, that currents $I_1$, $I_2$ and $I_3$ are zero and that the voltage across output capacitor 18 is zero. Since the voltage across capacitor 18 is zero, it is less than low threshold reference voltage on lead 29 of comparator 28, causing the latter to energize trigger circuit 30 and produce a trigger signal on lead $T_1$ to turn switch 20 on. Capacitor 16 discharges and current $I_1$ flows into capacitor 18 through inductor 17 and switch 20. Since inductor 17 and capacitor 18 form a DC resonant circuit, the voltage $V_{Out}$ across capacitor 18 rises toward a peak voltage of $2V_{In}$ When the voltage $V_{Out}$ reaches the predetermined desired voltage (less than $2V_{DC}$) which is equal to the high threshold voltage on reference lead 32 (FIG. 3), this condition is detected by comparator 31 which produces an output from trigger circuit 33 to lead $T_2$ to turn switch 22 on. The discharge current of capacitor 16 and inductor 17, shown as $I_2$, is then diverted to intermediate capacitor 23 to charge it. Voltage $V_{Out}$ on capacitor 18 remains at the desired value which is the functional requirement of the circuit.

When switch 22 is triggered to the conducting state, a resonant charging circuit comprising inductor 17 and capacitor 23 is formed. Depending on the energy remaining in inductor 17 and the charge on capacitor 23 when switch 22 is triggered, capacitor 23 charges to a final voltage in excess of $V_{In}$.

When current $I_2$ reverses direction in the newly formed resonant circuit, switch 22 automatically turns off. It should be noted that the excess energy that existed in inductor 17 when the voltage on capacitor 18 reaches the desired value is transferred to capacitor 23 by a nondissipative path and that the voltage on capacitor 18 is available for use by the output circuitry from the time the switch 22 is triggered.

The reversal of current $I_2$ after capacitor 23 reaches its final charge voltage is detected by comparator 34 which causes circuit 36 to produce a trigger signal on lead $T_3$ thereby turning switch 25 on. This produces a third DC resonant circuit comprising inductor 26 and capacitor 23 and causes the energy in capacitor 23 to be transferred to input capacitor 16 as indicated by current $I_3$. When the flow of current $I_3$ reverses, switch 25 automatically turns off. The capacitance of capacitor 16 is much larger than that of capacitor 23 and accordingly, the voltage across capacitor 23 when current $I_3$ reverses is nearly zero. At this final stage of the charge cycle, the excess energy that remains in inductor 17 when the output voltage $V_{Out}$ reaches the final desired value is transferred to input capacitor 16 by a nondissipative path and in such a manner that this excess energy is available for use on the succeeding charging cycle. The circuit conditions are returned to their initial values and the circuit is ready for another charging cycle.

While the above described embodiment of the invention indicates three separate sequences or stages within the operating cycle, an alternate operating sequence may be effected by triggering switches 20 and 25 simultaneously. A control circuit for accomplishing this result is shown in FIG. 5 and comprises a comparator 40 and a trigger circuit 41 connected as shown and described in FIG. 3 except that the output of trigger circuit 41 is connected to leads $T_1$ and $T_3$. The alternate mode of circuit operation is practical when circuit components are chosen so that the charging time constant of inductor 17 and output capacitor 18 is always longer than that of inductor 26 and capacitor 23. Not only does this operation result in auxiliary circuit economies but the overall charging time cycle is significantly shortened since the transfer of energy from capacitor 23 to capacitor 16 occurs at the same time as the transfer of energy from capacitor 16 to capacitor 18. This also results in a reduction in the peak energy requirement on the primary source power.

In order to prevent current surge damage to rectifier 12 on initial start-up of circuit 10 when the charge on capacitor 16 is zero and in order to permit charging of capacitor 16 as required during operation of the circuit, an SCR switch 45 having a trigger lead $T_4$ has an anode 45a connected to terminal 13 and a cathode 45b connected to capacitor 16. A shunt resistor 46 is connected across switch 45 as shown. A trigger capacitor 47 is connected between trigger lead $T_4$ and terminal 14 and a diode 48 has a cathode 48a connected to trigger lead $T_4$ and an anode 48b connected to the common junction of capacitor 16 and inductor 17.

In operation, with no charge on capacitor 16 and with switch 45 in the nonconducting state, energizing of rectifier 12 causes capacitor 16 to charge through resistor 46 which determines the charging time constant on the circuit. With resistor 46 in the circuit, capacitor 16 charges gradually and avoids a damaging surge of current on initial start-up. However, during subsequent operation of the circuit as the voltage on capacitor 16 changes, resistor 46 is effectively removed from the circuit as described below, thus eliminating losses and inefficiences that would result if it were not.

In order to maintain storage capacitor 16 at full charge, switch 45 is triggered on whenever the voltage on the capacitor falls below $V_{In}$. Capacitor 47 maintains trigger lead $T_4$ substantially at $V_{In}$. When the voltage on capacitor 16 falls below $V_{In}$, lead $T_4$ goes positive relative to the cathode 45a since diode 48 isolates capacitor 47 from capacitor 16, and switch 45 is turned on. This connects rectifier 12 to capacitor 16 for charging. When capacitor 16 is charged to $V_{In}$, lead $T_4$ is no longer positive relative to the cathode of switch 45 which is thereupon turned off. In this manner, capacitor 16 is maintained substantially at the full charge $V_{In}$ throughout operation of the circuit.

The above-described start-up circuit is described and claimed in our copending application Ser. No. 316,158.

What is claimed is:

1. A power supply for repetitively charging utilizing apparatus from an unregulated DC voltage source having a pair of terminals comprising first and second capacitors connected across said terminals, said first capacitor being adapted to be charged by said source, said second capacitor constituting part of said utility apparatus, a first inductor connected in series between said capacitors, a first bistable switch connected between said inductor and said second capacitor, a first means to trigger said switch to the conducting state for electrically connecting said capacitors through said inductor whereby said first capacitor discharges current through said inductor to resonantly charge said second capacitor, a third capacitor connected across said terminals in between said inductor and said switch, a second bistable switch connected in series with said third capacitor, second means responsive to a predetermined voltage on said second capacitor for triggering said second switch to the conducting state and electrically connecting said inductor to said third capacitor whereby charging current from said first capacitor to said second capacitor is diverted to said third capacitor to resonantly charge the latter, a second inductor and a third bistable switch connected in series between said first and third capacitors, and third means for triggering said third switch to the conducting state and electrically connecting said third and first capacitors through said second inductor whereby energy in said third capacitor is transferred to said first capacitor, said first and third means both being responsive to said predetermined voltage on said second capacitor for triggering said first and third switches simultaneously.

2. A power supply for repetitively charging a pulse forming network having a charging capacitor comprising a storage capacitor, a first resonant charging circuit connected to said storage capacitor comprising a first inductor and said charging capacitor, a first switch connected between said inductor and said charging capacitor and operable to cause energy to be transferred from said storage capacitor to said charging capacitor, a second resonant circuit comprising an intermediate capacitor and said first inductor, a second switch between said inductor and said intermediate capacitor, means to trigger said second switch to the conducting state prior to full charging of said charging capacitor whereby to divert charging current from said first inductor to said intermediate capacitor, a third resonant circuit connected to said storage capacitor comprising said intermediate capacitor and a second inductor, a third switch between said intermediate capacitor and said second inductor, and means simultaneously to trigger said first and third switches to the conducting states whereby simultaneously to transfer energy from said intermediate and storage capacitors to said charging capacitor.

* * * * *